March 12, 1957 G. E. OLSON ET AL 2,784,846
FILTERS
Filed July 1, 1953 2 Sheets-Sheet 1

INVENTORS.
George E. Olson,
BY Dwight L. Ebert,

March 12, 1957  G. E. OLSON ET AL  2,784,846
FILTERS
Filed July 1, 1953  2 Sheets-Sheet 2

INVENTORS.
George E. Olson,
BY Dwight L. Ebert,

United States Patent Office 2,784,846
Patented Mar. 12, 1957

2,784,846

FILTERS

George E. Olson and Dwight L. Ebert, Chicago, Ill., assignors, by mesne assignments, to The American Laundry Machinery Company, a corporation of Ohio Application July 1, 1953, Serial No. 365,332

8 Claims. (Cl. 210—184)

This invention relates to a new and improved filter and more particularly to a filter of the upflow type for filtering liquids.

The present invention is in the nature of an improvement of the filter disclosed in our prior application Serial No. 204,220, filed January 3, 1951, now Patent No. 2,693,882, for Upflow Filters.

The present filter comprises upper and lower chambers with tubular filter members extending down into the lower chamber and communicating through a separating partition with the upper chamber. Such a construction is shown in our prior application, but the present application discloses a different construction insofar as concerns the distribution of the incoming liquid to be filtered.

It is an object of the present invention to provide a new and improved upflow filter comprising removable filtering elements.

It is an additional object to provide a construction of this character in which means are provided for causing a downflow of the liquid to be filtered while in contact with the filtering elements.

It is a further object to provide a construction having a plurality of depending tubular filter elements together with means for directing the fluid to be filtered downwardly adjacent and surrounding each of said elements.

It is another object to provide a filter including a fluid distribution chamber surrounding the upper ends of depending filter elements, the upper ends of said elements being impervious.

It is also an object to provide a construction which is efficient in design and adapted for commercial production and use.

Other and further objects will appear as the description proceeds.

We have shown certain preferred embodiments of our invention in the accompanying drawings in which—

Figure 1:
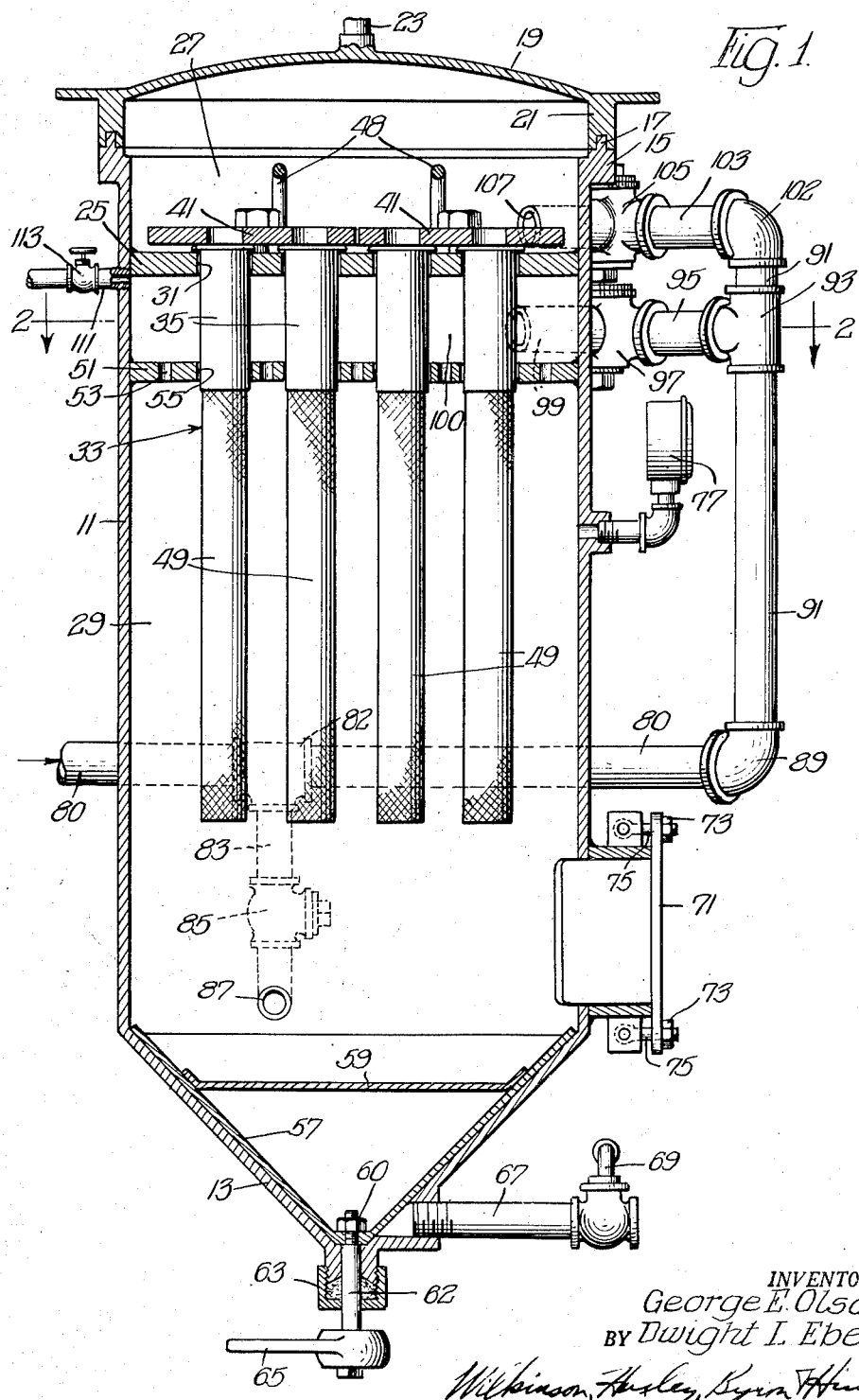
Figure 1 is a vertical section through a preferred construction of filter.

The filter includes a cylindrical housing 11 having a conical bottom portion 13. The upper end of the housing 11 has a laterally extending flange 15 which has an upwardly extending circumferential rib 17. The cover member 19 is provided with a downwardly extending flange 21 having a circumferential groove mating with the rib 17 on the body member. Any suitable means, not shown, may be provided for holding the cover in place. This may comprise means forcing the cover downwardly through pressure against the central lug 23.

Figure 3:
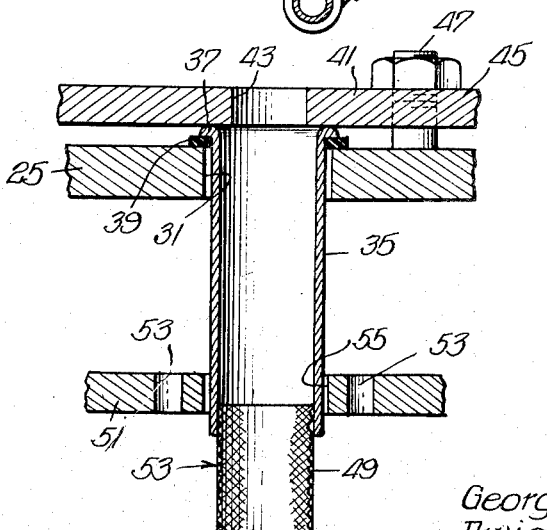
Figure 3 is a fragmentary section, on an enlarged scale, showing the construction of the filtering tubes and the means for retaining them in position.

The transverse partition 25 is secured in place in the housing 11, as by welding or the like, and serves to divide the interior into an upper chamber 27 and a lower chamber 29. This partition 25 is provided with a plurality of openings 31 through which pass the upper portions of the tubular filter elements 33. These elements 33, as best shown in Figure 3, comprise impervious sleeves 35 at their upper portions, these sleeves having outturned circular flanges 37 at their upper ends. These flanges 37 bear on packing washers 39 to support the elements 33 from the partition 25. The hold-down plates 41 engage the flanges 37 on elements 33 and force them downwardly against the packing washers 39. These plates 41 are provided with circular openings 43 in registration with the several tubular elements. Plates 41 are held down by means of nuts 45 screwed on threaded lugs 47 which extend upwardly from the partition 25 and are provided with handles 48 for ready removal.

The lower portions 49 of the tubular members 33 are formed of any suitable material having a plurality of small openings therethrough. Such materials, by way of example, may be perforated metal, woven wire mesh or porous ceramic tubes depending on the character of the filtering action desired. It will be understood that with certain types of lower portions 49, it may be desired to form a filter cake upon the elements in a manner well known in the filtering art.

The lower partition 51 is located below and parallel to the partition 25 and may be welded in place in the same manner as partition 25. This partition is shown in plan view in Figure 2 and is provided with a plurality of spaced perforations 53. It is also provided with a plurality of circular openings 55 which are somewhat larger than the tubular upper portions 35 of the tubular filter elements 33. These openings 55 therefore form a circular space for downward passage of material to be filtered surrounding the impervious upper section 35 of each of the filter elements 33.

The lower conical portion 13 of the filter is provided with scraper arms 57 held apart and adjacent the inner conical surface by the brace member 59 which may be welded to the arms. The scraper is secured by nut 60 to the shaft 62 which extends out through the gland 63 at the bottom of the filter. The lower end of shaft 62 is provided with a handle 65 by means of which the scraper 57 may be oscillated or rotated to loosen sludge or other waste foreign matter which may be deposited in the bottom of the filter. The loosened material may be drawn off through pipe 67 controlled by valve 69. The scraper may also be used to stir up material deposited in the filter to form a filter cake on the tubes 49. The lower portion of the lower chamber 29 above the conical bottom 13 is provided with a clean-out and inspection door 71 removably held in place by nuts 73 fitting on the swing bolts 75. The lower chamber 29 is also shown as provided with a pressure gauge 77 which may be of any usual type.

Figure 2:
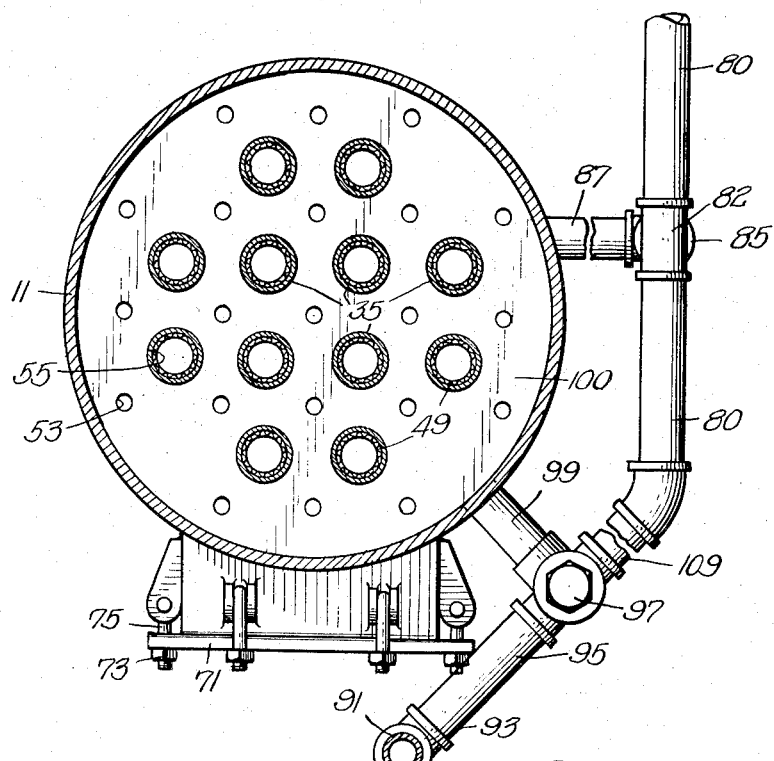
Figure 2 is a transverse section taken on line 2—2 of Figure 1.

The piping for introducing and removing the fluid and for backwashing includes a plurality of control valves. The inlet for material to be filtered is through the pipe 80, which pipe is provided adjacent the lower portion of the filter with a T connection 82 connected by pipe 83 with a valve 85. The elbow pipe 87 connects into the lower portion of lower chamber 29 through the valve 85. The pipe 80 continues laterally and through elbow 89 leads to vertical pipe 91. This pipe 91 is provided with a T 93 connected by pipe 95 with a three-way valve 97. This valve 97 communicates through pipe 99 with the chamber 100 located between the partition 25 and the lower partition 51. The T section 93 connects through elbow 102 and pipe 103 to the three-way valve 105. This valve 105 leads through pipe 107 into the outlet chamber 27 above the upper partition 25. The other side of three-way valve 105 leads to a pipe (not shown) to carry off the filtered liquid. The three-way valve 97 leads also to pipe 109, a portion of which is shown in Figure 2, leading to any point desired, to dispose of backwashing liquid.

It will be understood that the exterior piping may be varied according to differing conditions and requirements and the particular arrangement shown and described is by way of example only in order that the operation of the filter may be clearly described.

The filter housing 11 is provided with an outlet pipe 111 controlled by valve 113 for withdrawing air or gas which may be trapped in chamber 100 below the partition 25 and around the imperforate tube sections 35.

In the operation of the filter, the filter is assembled in the manner shown in the drawings and, if desired, filter cake forming material is introduced in the bottom of the filter housing 11. The liquid to be filtered may, at this time, be introduced through pipe 80, pipe 83 and, valve 85 being opened, into the bottom of the lower chamber 29 through pipe 87. The flow of liquid will stir up the loose material and carry it upwardly against the perforated tubes 49 where it will be deposited. The liquid will pass on through the forming filter cake and out the top of the tubes into the upper chamber 27. If desired, the scraper blades 57 may be oscillated or rotated at this time by means of handle 65 to assist in stirring up the material. During this preparatory period, the three-way valve 97 may be turned to permit additional fluid to enter the intermediate chamber 100 through pipe 99. If desired, the valve 97 may be so turned that all flow of fluid through pipe 99 is closed off. The three-way valve 105 will be turned to connect the outflow pipe 107 to the pipe (not shown) for carrying off the filtered liquid.

During normal operation of the filter, valve 85 will be closed and all of the fluid to be filtered will pass up through pipe 91, through pipe 95 and through valve 97 to enter the chamber 100 through pipe 99. Here the liquid will be dispersed throughout the entire chamber 100 around the upper closed tubular portions 35 of tubes 33. The liquid will pass downwardly from chamber 100 through the perforations 53 and through the narrow circular passages 55 around the tubular portions 35. It will continue to pass downwardly around the filter tube portions 49 and the liquid will pass through these tubes while the tubes will filter out the entrained material. The clear liquid passes up through the inside of the upper tubes 35 and out through openings 43 in plates 41 into the upper chamber 27. From this chamber 27 the filtered liquid passes out through pipe 107 and valve 105.

When it is desired to backwash the filter tubes, the valves 97 and 105 are adjusted so that the incoming liquid from pipe 80 passes through pipes 91 and 103 and through valve 105 and pipe 107 into chamber 27. From chamber 107 it passes down through the filter tubes 33 and out through the lower filtering portion 49 of those tubes into lower chamber 29. From chamber 29 it passes upwardly through perforations 53 and circular openings 55 in partition 51. From chamber 100 it is drawn off through pipe 99 and valve 97 to be discharged through pipe 109. It will be understood that other connections may be made to provide filtered liquid for backwashing purposes rather than using the normal incoming liquid through pipe 80.

Sludge deposited during normal filtering and during backwashing may be removed by being loosened and stirred up by scraper 57 and being drawn off through pipe 67, the valve 69 being opened. Whenever necessary, the entrained air or gas in the upper chamber 100 may be drawn off by opening valve 113 in pipe 111.

It will be apparent that the construction shown serves to thoroughly and substantially uniformly distribute the incoming fluid to be filtered around the several filter tubes. The liquid passes downwardly around the tubes and there is no tendency to stir up any sludge or foreign material which may be in the bottom of the lower chamber 29. The impervious sections 35 of the filter tubes in chamber 100 prevent any passage of liquid so that all of the liquid passes downwardly around the filtering portions 49 of these tubes. The filtering action is therefore well distributed among the tubes and along the lengths of the tubes so that they may operate efficiently without substantial localized clogging.

The preferred embodiments of our invention which have been shown and described are to be understood to be illustrative only as it is capable of variation to meet different conditions and requirements and we contemplate such modifications as come within the spirit and scope of the appended claims.

We claim:

1. In a filter, a vertical housing, an upper partition therein separating the interior of the housing into upper and lower chambers, depending filter elements supported by the partition, a second partition below the first partition, said second partition having openings therein larger than the depending elements so that passages are provided in said partition surrounding the elements which extend downwardly through the openings, the chamber between the upper and second partition being provided with means for introducing therein liquid to be filtered and serving as a distribution chamber for said liquid.

2. In a filter, a vertical housing, an upper partition therein separating the interior of the housing into upper and lower chambers, depending filter elements supported by the partition, a second partition below the first partition, said second partition having openings therein larger than the depending elements so that passages are provided in said partition surrounding the elements which extend downwardly through the openings, the chamber between the upper and second partition being provided with means for introducing therein liquid to be filtered and serving as a distribution chamber for said liquid, the portions of said depending elements in the distribution chamber being impervious to the liquid being filtered.

3. In a filter, a vertical housing, an upper partition therein separating the interior of the housing into upper and lower chambers, the upper partition having a plurality of spaced openings therein, elongated tubular filter elements fitting in and closing said openings and extending downwardly from the partition, a second partition below the first partition, said second partition having openings therein registering with the openings in the upper partition and of a size larger than the filter elements, said elements passing therethrough while providing a clearance around said elements to permit passage of liquid, means for introducing liquid to be filtered between said partitions and means for withdrawing filtered liquid from the upper chamber.

4. In a filter, a vertical housing, an upper partition therein separating the interior of the housing into upper and lower chambers, the upper partition having a plurality of spaced openings therein, elongated tubular filter elements fitting in and closing said openings and extending downwardly from the partition, a second partition below the first partition, said second partition having openings therein registering with the openings in the upper partition and being of a size larger than the filter elements, said elements passing therethrough while providing a clearance around said elements to permit passage of liquid, means for introducing liquid to be filtered between said partitions and means for withdrawing filtered liquid from the upper chamber, the upper portions of the tubular filter elements being impervious to a point below the second partition.

5. In a filter, a vertical housing, an upper partition therein separating the interior of the housing into upper and lower chambers, means for withdrawing liquid from the upper chamber, a plurality of tubular filter elements extending downwardly from the upper partition, the upper partition having openings therein permitting passage of liquid upwardly from the interior of said filter elements, a second partition located below and spaced from the upper partition to form a liquid distribution chamber between said partitions, the second partition having openings therein aligned with the openings in the upper partition, said openings being larger than the filter elements, means for introducing liquid to be filtered into said distribution chamber, the filter elements extending downwardly through the distribution chamber and through the openings in the second partition and downwardly a substantial distance below the second partition, the portions of the filter elements in the distribution chamber being impervious to the liquid being filtered and the portions of the filter elements below the second partition being pervious to the liquid and serving to remove entrained matter therefrom.

6. In a filter, a vertical housing, an upper partition therein separating the interior of the housing into upper and lower chambers, depending filter elements supported by the partition, a second partition below the first partition, said second partition having a plurality of openings therein, certain of said openings being larger than the depending elements so that passages are provided in said partition surrounding the elements which extend downwardly through the openings, the chamber between the upper and second partition being provided with means for introducing therein liquid to be filtered and serving as a distribution chamber for said liquid.

7. In a filter, a vertical housing, an upper partition therein separating the interior of the housing into upper and lower chambers, the upper partition having a plurality of spaced openings therein, elongated tubular filter elements fitting in and closing said openings and extending downwardly from the partition, a second partition below the first partition, said second partition having a plurality of openings therein, certain of said openings registering with the openings in the upper partition and of a size larger than the filter elements, said elements passing therethrough while providing a clearance around said elements to permit passage of liquid, means for introducing liquid to be filtered between said partitions and means for withdrawing filtered liquid from the upper chamber, the upper portions of the tubular filter elements being impervious to a point below the second partition.

8. In a filter, a vertical housing, an upper partition therein separating the interior of the housing into upper and lower chambers, means for withdrawing liquid from the upper chamber, a plurality of tubular filter elements extending downwardly from the upper partition, the upper partition having openings therein permitting passage of liquid upwardly from the interior of said filter elements, a second partition located below and spaced from the upper partition to form a liquid distribution chamber between said partitions, the second partition having a plurality of openings therein, certain of the openings being aligned with the openings in the upper partition, said aligned openings being larger than the filter elements, means for introducing liquid to be filtered into said distribution chamber, the filter elements extending downwardly through the distribution chamber and through the aligned openings in the second partition and downwardly a substantial distance below the second partition, the portions of the filter elements in the distribution chamber being impervious to the liquid being filtered and portions of the filter elements below the second partition being pervious to the liquid and serving to remove entrained matter therefrom.

References Cited in the file of this patent

UNITED STATES PATENTS

| Number | Name | Date |
|---|---|---|
| 582,400 | Stifel | May 11, 1897 |
| 930,167 | Endler | Aug. 3, 1909 |
| 1,175,948 | French | Mar. 21, 1916 |
| 1,477,885 | Lehmann | Dec. 18, 1923 |
| 1,771,928 | Jung | July 29, 1930 |
| 1,809,130 | Macomber | June 9, 1931 |
| 2,390,494 | Briggs et al. | Dec. 11, 1945 |
| 2,562,699 | Cooperson et al. | July 31, 1951 |